(12) United States Patent
Bellis, II et al.

(10) Patent No.: US 8,576,487 B2
(45) Date of Patent: Nov. 5, 2013

(54) SPOKE LIGHT RECAPTURE FOR THE SPOKE BETWEEN A COLOR OF A WHEEL AND ITS NEUTRAL DENSITY COMPLEMENT

(75) Inventors: Harold E. Bellis, II, Garland, TX (US); Gregory J. Hewlett, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 856 days.

(21) Appl. No.: 11/031,177

(22) Filed: Jan. 7, 2005

(65) Prior Publication Data

US 2005/0168454 A1    Aug. 4, 2005

Related U.S. Application Data

(60) Provisional application No. 60/535,166, filed on Jan. 7, 2004.

(51) Int. Cl.
*G02B 27/10* (2006.01)

(52) U.S. Cl.
USPC .......................................................... 359/618

(58) Field of Classification Search
USPC ...................................... 345/84, 108; 348/270
See application file for complete search history.

(56) References Cited

U.S. PATENT DOCUMENTS 6,445,505 B1 * 9/2002 Morgan ......................... 359/618
7,113,152 B2 * 9/2006 Ben-David et al. ............. 345/32

* cited by examiner

*Primary Examiner* — Dennis Joseph
(74) *Attorney, Agent, or Firm* — Warren L. Franz; Wade J. Brady, III; Frederick J. Telecky, Jr.

(57) ABSTRACT

Disclosed is a video display system comprising a spatial light modulator, such as a DMD modulator. The system uses a light source and color-wheel filter that is interposed between the light source and the spatial light modulator, the color-wheel filter being divided into primary color segments and at least one neutral density ("ND") segment that is complementary to at least one of the primary color segments and having a transmissivity that is lower than that of its corresponding primary color segment. At the border between the ND segment and its complementary primary color segment is an area that can be referred to as an ND spoke. The video display system modulates light from this ND spoke area along with light from the other segments.

21 Claims, 3 Drawing Sheets

| (NON-ND) | | | | | | | | |
|---|---|---|---|---|---|---|---|---|
| | (B0) 1 | (B1) 2 | (B2) 4 | (B3) 8 | (B4) 16 | (B5) 32 | (B6) 64 | (B7) 128 |
| 1 | 1 | 0 | 0 | 0 | 0 | 0 | 0 | 0 |
| 2 | 0 | 1 | 0 | 0 | 0 | 0 | 0 | 0 |
| 3 | 1 | 1 | 0 | 0 | 0 | 0 | 0 | 0 |
| 4 | 0 | 0 | 1 | 0 | 0 | 0 | 0 | 0 |
| 5 | 1 | 0 | 1 | 0 | 0 | 0 | 0 | 0 |
| 6 | 0 | 1 | 1 | 0 | 0 | 0 | 0 | 0 |
| ⋮ | | | | ⋮ | | | | |
| 255 | 1 | 1 | 1 | 1 | 1 | 1 | 1 | 1 |

*FIG. 4*

| | (ND) | | | | ND-SPOKE | (NON-ND) | | |
|---|---|---|---|---|---|---|---|---|
| | (B0) .25 | (B1) .5 | (B2) 1 | (B3) 2 | (B4) 4 | (B5) 8 | (B6) 16 | (B7) 32 |
| 1 | 0 | 0 | 1 | 0 | 0 | 0 | 0 | 0 |
| 2 | 0 | 0 | 0 | 1 | 0 | 0 | 0 | 0 |
| 3 | 0 | 0 | 1 | 1 | 0 | 0 | 0 | 0 |
| 4 | 0 | 0 | 1 | 1 | 1 | 0 | 0 | 0 |
| ⋮ | | | ⋮ | | ⋮ | | ⋮ | |
| 63 | 0 | 0 | 1 | 1 | 1 | 1 | 1 | 1 |
| 63.25 | 1 | 0 | 1 | 1 | 1 | 1 | 1 | 1 |
| 63.50 | 0 | 1 | 1 | 1 | 1 | 1 | 1 | 1 |
| 63.75 | 1 | 1 | 1 | 1 | 1 | 1 | 1 | 1 |

*FIG. 5*

SPOKE LIGHT RECAPTURE FOR THE SPOKE BETWEEN A COLOR OF A WHEEL AND ITS NEUTRAL DENSITY COMPLEMENT

CROSS-REFERENCE TO RELATED APPLICATIONS

This application claims priority to U.S. Provisional Patent Application No. 60/535,166, filed Jan. 7, 2004 entitled "Spoke Light Recapture for the Spoke Between a Color of a Wheel and its Neutral Density Complement," which is hereby incorporated by reference for all purposes.

FIELD OF THE INVENTION

Disclosed are systems and methods related to the field of display systems, and more particularly to color correction of display systems, particularly display systems using primary color sources to generate full-color images and using color wheels to sequentially provide the primary color sources from a single white light source.

BACKGROUND OF THE INVENTION

A prior, commonly-owned patent, U.S. Pat. No. 6,455,505, to Morgan, which is hereby incorporated by reference herein in its entirety, disclosed a color wheel system that recaptured light from the spoke areas—the boundary areas between colors—of a color wheel. The color wheel typically is a disk-shaped assembly of dichroic filters. Other shapes of "color wheels" are possible, such as rotating drums or polygons. A white-light beam is focused on the color wheel and the dichroic filters, which may be transmissive or reflective and which thereupon filter the white light to form a primary-color light beam. The color wheel includes at least one filter "segment" for each of the primary colors, and most likely also includes a white segment.

Spinning the color wheel so that each filter passes through the point at which the white light beam strikes the color wheel generates a sequential primary color light beam. The color wheel typically is spun fast enough to create at least one primary color period for each primary color during each frame of a video image. Spinning the wheel faster, or using multiple filter segments for one or more of the primary colors can reduce color separation artifacts that allow the viewer to detect the sequential color nature of the display system.

While a sequential color display system typically costs less to produce than a simultaneous color display system, images created by a sequential filtered color display system are not as bright as images created by simultaneous color display systems using the same light source. This is because at any given time only a portion of the light generated by the light source is being used to form the image. For example, when using a three-color equal-segment filter wheel, each primary color is produced only ⅓ of the time. Additionally, when a sequential filter such as a color wheel is used, the light during the filter transitions, typically called spoke times, will be a varying mixture of the two filters being changed in and out. The Morgan patent taught that such spoke light can be recaptured and used during white light periods, as it is undesirable to "throw away" light, given that high image brightness is one of the major desires of customers in the projection display market.

While the above approach is described in the context of a color wheel having filters for the primary colors and possibly white, the use of "neutral density" filters has also been disclosed by Hewlett et al. in commonly owned U.S. Pat. No. 5,812,303, which is hereby incorporated by reference herein in its entirety. Such neutral density filters, instead of providing different colors, provide additional segment filters of the same color as the regular primary colors, except with a lower level of reflectivity (or transmissivity for a transmissive application). As disclosed in the Hewlett et al. patent, such neutral density filters allow for the use of longer modulated bit times to accomplish lower intensity color signals, which is sometimes important for proper timing for the modulation of the pixels of a Digital Micromirror Device (DMD) or other light modulation system. Specifically, as discussed in the '303 patent, there may be limitations on the minimum bit times available for the display of bits, which would otherwise pose a limitation on the least significant intensity bits, and the neutral density filters by their lower transmissivities provide for lower intensity light without necessitating ever-shorter "on" times for the pixels. In this type of a wheel, there will be transitions both between color filters, e.g., between red and green filters, and between regular color filters and Neutral Density ("ND") filters, e.g., between green filter segments and ND green filter segments.

SUMMARY OF THE SYSTEM AND METHOD

Systems and methods described in this application for more effectively using the light transmitted (or in some cases, reflected) in the transitions between a color and its ND complement on, for example, a color wheel. Specifically, the spoke light segments between a color and its ND complement can be used to illuminate with that color, thereby increasing the color brightness available for the particular color.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates a table that sets forth bit-weights for exemplary bit-planes in a typical 8-bit system; and FIG. 5 illustrates a table that sets forth bit-weights for exemplary bit-planes in an 8-bit non-binary system employing ND bits and an ND spoke segment.

DETAILED DESCRIPTION OF THE PREFERRED EMBODIMENTS

Figure 1:
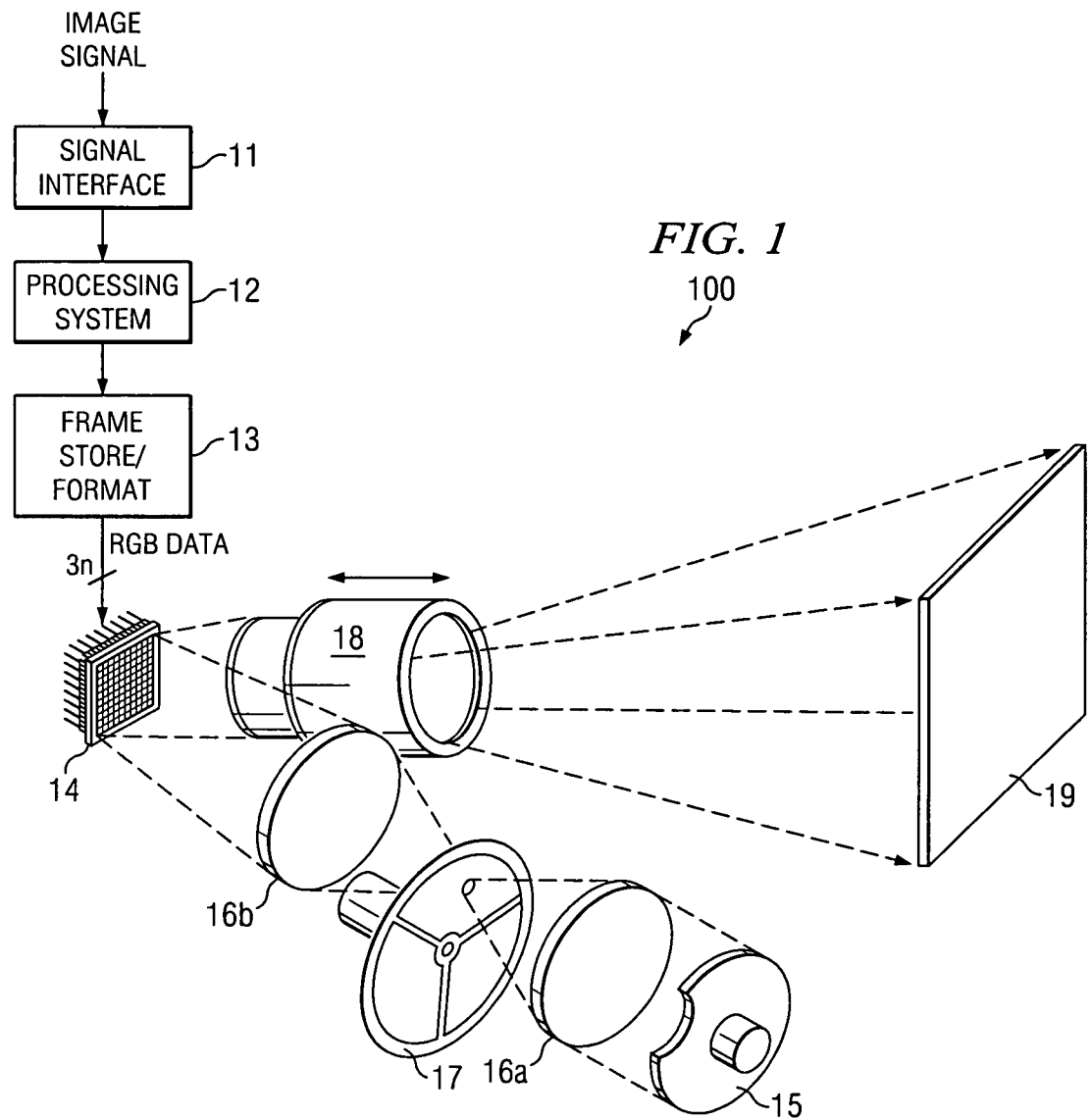
FIG. 1 illustrates one embodiment of a projection display system, which uses an SLM having a DMD therein to generate real-time images from an input signal.

Referring initially to FIG. 1, illustrated is one embodiment of a projection visual display system 100, which uses a Spatial Light Modulator (SLM) having a DMD 14 therein to generate real-time images from an input signal. The input image signal may be from a television tuner, MPEG decoder, video disc player, video cassette player, PC graphics card, or the like. Only those components significant to main-screen pixel data processing are shown. Other components, such as might be used for processing synchronization and audio signals or secondary screen features, such as closed captioning, are not shown for simplicity.

In the illustrated embodiment, an input image signal, which may be an analog or digital signal, is input to a signal interface unit 11. In embodiments where the input signal is analog, an analog-to-digital converter (not illustrated) may be employed to convert the incoming signal to a digital data signal. Signal interface unit 11 receives the data signal and separates video, synchronization, and audio signals. In addition, a Y/C separator is also typically employed, which converts the incoming data from the image signal into pixel-data samples, and which separates the luminance ("Y") data from the chrominance ("C") data, respectively. Alternatively, in other embodiments, Y/C separation could be performed before A/D conversion.

The separated signals are then input to a processing system 12. Processing system 12 prepares the data for display, by performing various pixel data processing tasks. Processing system 12 may include whatever processing components and memory useful for such tasks, such as field and line buffers. The tasks performed by the processing system 12 may include linearization (to compensate for gamma correction), colorspace conversion, and interlace to progressive scan conversion. The order in which all of the tasks performed by the processing system 12 may vary.

Once the processing system 12 is finished with the data, a display memory module 13 receives processed pixel data from the processing system 12. The display memory module 13 formats the data, on input or on output, into bit-plane format, and delivers the bit-planes to the SLM. As discussed in the Background section, the bit-plane format permits single or multiple pixels on the DMD 14 to be turned on or off in response to the value of one bit of data, in order to generate one layer of the final display image. In one embodiment, the display memory module 13 is a "double buffer" memory, which means that it has a capacity for at least two display frames. In such a module, the buffer for one display frame may be read out to the SLM while the buffer for another display frame is being written. To this end, the two buffers are controlled in a "ping-pong" manner so that data is continuously available to the SLM.

For the next step in generating the final desired image, the bit-plane data from the display memory module 13 is delivered to the SLM. Although this description is in terms of an SLM having a DMD 14 (as illustrated), other types of SLMs could be substituted into display system 100. Details of a suitable SLM are set out in U.S. Pat. No. 4,956,619, entitled "Spatial Light Modulator", which is commonly owned with the present disclosure and incorporated herein by reference in its entirety. In the case of the illustrated DMD-type SLM, each piece of the final image is generated by one or more pixels of the DMD, as described above. Essentially, the SLM uses the data from the display memory module 13 to address each pixel on the DMD 14. The "ON" or "OFF" state of each pixel forms a black or white piece of the final image, and an array of pixels on the DMD 14 is used to generate an entire image frame. Each pixel displays data from each bit-plane for a duration proportional to each bits pulse width modulation (PWM) weighting, which is proportional to the length of time each pixel is ON, and thus its intensity in displaying the image. In the illustrated embodiment, each pixel of DMD 14 has an associated memory cell to store its instruction bit from a particular bit-plane.

For each frame of the image to be displayed, Red, Green, Blue (RGB) data may be provided to the DMD 14 one color at a time, such that each frame of data is divided into red, blue, and green data segments. Typically, the display time for each segment is synchronized to a color wheel 17, which rotates so that the DMD 14 displays the data for each color through the color wheel 17 at the proper time. Thus, the data channels for each color (RGB) are time-multiplexed so that each frame has sequential data for the different colors. Moreover, in systems employing neutral-density (ND) color filtering, the color wheel 17 may include additional sections for illuminating ND versions of the basic RGB colors. A detailed description of ND filtered illumination using a color wheel may be found in U.S. Pat. No. 5,812,303, which is commonly owned with the present disclosure and incorporated herein by reference in its entirety.

For a sequential color system, such as the system 100 illustrated in FIG. 1, a light source 15 provides white light through a condenser lens 16a, which focuses the light to a point on the rotating color wheel 17. A second lens 16b may be employed to fit the colored light to the size of the pixel array on the DMD 14. Reflected light from the DMD 14 is transmitted to a display lens 18. The display lens 18 typically includes optical components for illuminating an image plane, such as a display screen 19.

In an alternative embodiment, the bit-planes for different colors could be concurrently displayed using multiple SLMs, one for each color component. The multiple color displays may then be combined to create the final display image. Of course, a system or method employing the principles disclosed herein is not limited to either embodiment.

Figure 2:
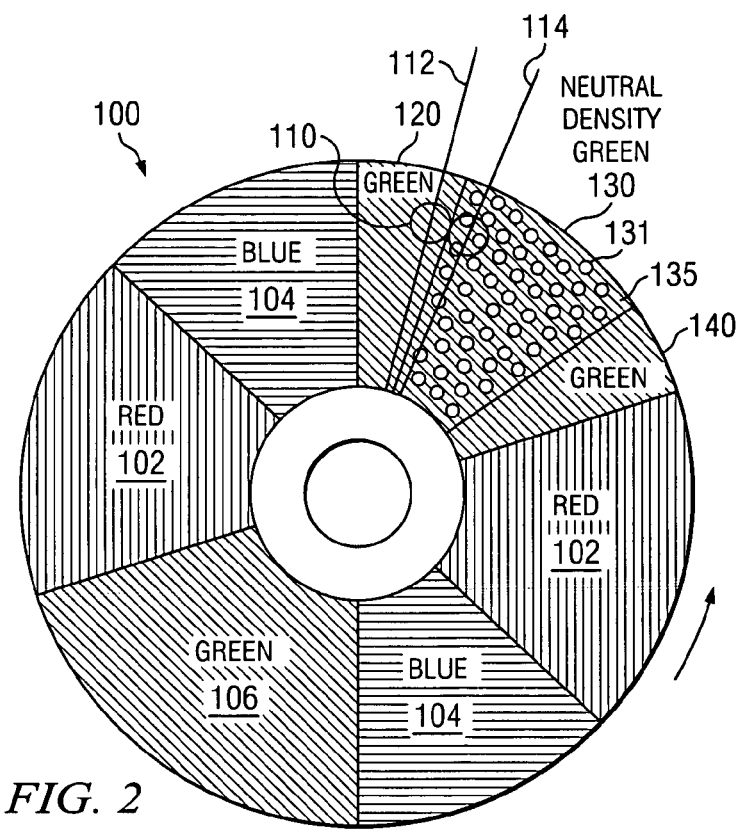
FIG. 2 is a plan view of a color wheel showing the region the light beam passes through, where the color wheel includes at least one ND color segment adjacent to its complementary non-ND segment.

FIG. 2 is a plan view of a multi-segment color wheel 100. The color wheel 100 has red segments 102, blue segments 104, a green segment 106. The color wheel 100 also has another green segment made up of two split green segments, 120, 140, and an ND green segment 130 located between the two split green segments 120, 140. The ND segment 130 has a lower transmissivity than the regular green segments 106, 120, 140. The wheel could also have a white segment according to design needs. The color wheel is spun in the direction shown so that a stationary light spot—the portion of the color wheel that the white light beam strikes—passes through each segment in a complete revolution. Thus, as the wheel is turned, the light spot 110 travels from the first split green segment 120, through the ND green segment 130, through the second split green segment 140, through the red segment 102, etc.

At the interface between the different colors, such as between the second split green segment 140 and the red segment 102, a spoke light recapture technique such as that described in the Morgan disclosure cited above could be used to generate additional white light in order to increase the intensity of the image display. At the interface between the primary colors and their ND complements (such as the illustrated ND green 130), different techniques can be used in order to increase the light available for the particular colors. In other situations, an ND segment may transition to a non-ND segment of a different color. For example, an ND green segment may transition to a red segment, or perhaps even an ND red segment. Such situations may be handled using the approaches disclosed in the cited Morgan disclosure.

Radial 112 shows the point at which the white light spot 110 first reaches the ND green filter segment 130. Thus, when the center of the white light spot 110 crosses radial 112, the spectral performance of the color wheel 100 begins to be affected by the incident light/color striking the ND green portion 130 and the color produced by the filter wheel 100 begins to transition from green to ND green. When the white light spot 110 is centered on radial 114, the spot is then completely contained within the ND green segment 130.

Therefore, radials 112 and 114 are separated by the width of the white light spot 110 at the point the center of the white light spot 110 crosses the radials.

The time it takes for the white light spot 110 to transition across one of these filter spokes—from radial 112 to radial 114—is approximately 400 microseconds in a typical system that spins the color wheel 100 at twice the frame rate. As discussed below, this transition period will cause ramp periods of intensity between the primary color segments (e.g., 120, 140) and their ND complements (e.g., 130).

As was discussed in the Morgan disclosure, the spoke light periods can eat up as much as 19.2% or more of each frame period, and that was for an example in which there were four different color segments. In a system having ND color segments, this problem would be also played out in the transitions between the color segments and their ND complements. By the approach described in this disclosure, however, not only is the overall intensity increased, but the intensity available for a particular component color is also increased.

Most display systems that use a white light source and a color wheel create single-color light beams that do not have equal intensities. For example, the green light beam created by many display systems is much more intense than the red light beam. The eye perceives colors in the natural world at different intensities. For example, 70% of the intensity (lumens) of white light comes from the green light component. Typical ratios for light that is perceived as white are 20% red, 70% green, and 10% blue. Display systems mimic this ratio, by tuning the display period (color wheel segment size), light source, and filter pass-band characteristics, to produce natural looking whites. This disclosure will ignore methods used to compensate for unequal intensities and focus solely on the methods used to utilize the spoke light transitions between color segments and their ND complements.

To the extent that using these spoke periods may introduce chromaticity or intensity errors, turning on the spoke periods only during the display of very bright images further suppresses the viewer's perception of the chromaticity errors. The ability of the human eye to perceive a certain chromaticity error diminishes as the image containing the error grows brighter. Thus, while limiting the use of spoke period light does not reduce the magnitude of either the chromaticity or intensity errors, it ensures the errors occur when the human eye is least likely to detect them.

Although all of the spoke periods are turned on when the display system displays an image at its maximum possible brightness, the use of colors, ND colors, and the spoke light segments between them can create artifacts that are created by the different effective color temperatures of the these three different segments. Further, turning on the different segments in an all-or-nothing fashion can cause noticeable shifts in the color points. Accordingly, it is desirable to mix the several segments together as the color levels are gradually changed. This disclosure describes a way to mix the different color levels during these times of transition. Further, as previously mentioned, it may be desirable to introduce the ND spoke periods during times of very bright images, to limit the resulting artifacts to times in which the viewer's capacity to detect the artifacts is physiologically reduced. Likewise, the artifacts that are created are dithered to cause the chromaticity errors to converge to zero over space, time, and as the intensity is increased.

Figure 3:
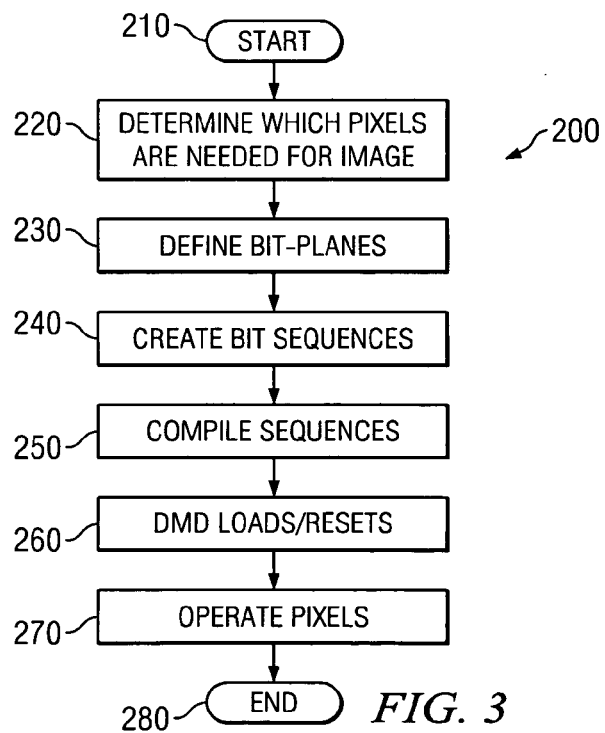
FIG. 3 illustrates a flow diagram detailing the function of the processing system and display memory module illustrated in FIGS. 1 & 2.

Turning now to FIG. 3, illustrated is a flow diagram 200 detailing the function of the processing system 12 and display memory module 13 illustrated in FIG. 1. The process begins at a start step 210, which may include the receipt of the incoming image signal, as well as any decoding of the signal that may be required.

At block 220, a determination is made of which pixels on the DMD (for example, the DMD 14 in FIG. 1) are to be turned ON, and which are to be turned OFF, in order to create the desired image. In addition, at block 220, the duration each pixel is to be left ON is determined. The "on-time" of each pixel establishes the intensity provided to the specific portion of the image (e.g., an illustrated pixel of the displayed image) by each specific DMD pixel. Once the determination of which pixels are to be turned ON, as well as each pixel's individual on-time, is made, the process moves to block 230.

At block 230, the bit-planes that will be used to "build" the final displayed image are defined. The bit-planes correspond to the various levels of grayscale (i.e., levels of brightness between white and black) available to project an image. For example, in a binary 8-bit display system, there will be a corresponding number of bit-planes created for a single frame of the image being displayed. As previously discussed in commonly owned U.S. application Ser. No. 10/309,947, which is hereby incorporated by reference, each frame period (the time for displaying a frame of display data) is divided into a number of time slices, and the values of the different bit weights determine the time slots during which a particular pixel is "on" during the frame period. If each pixel has an N-bit value, it has bit weights n=0, 1, 2 . . . N. Each nth bit weight of all pixels comprises a bit-plane, and there are N bit-planes per frame. In the simplest PWM schemes, during the longest time slot, the most significant bit (MSB) bit weights of all pixels are loaded to the SLM 13, and those pixels whose MSB is "1" are "on" during that time slot.

At block 240, bit sequences are created that set forth the order and intensity for operating selected ones of the pixels on the DMD. Moreover, such bit sequences are generated for each bit-plane in order to properly operate the DMD to display a complete final image. In a related embodiment, the sequence generator is configured to generate the bit sequences, and thus the PWM signals, at the time of manufacture of the display system, where the selected PWM signals are based on the intensity (i.e., ON time) of the selected pixels. Of course, a system incorporating a technique according to this disclosure is not limited to either embodiment of PWM signal generation.

In many embodiments, it may be desirable to split the bits in each of the bit-planes such that they are executed by the DMD in segments. In these embodiments, the specific pixels used to execute a single bit are operated multiple times at different periods during the frame-time, rather than executing the bit in one continuous operation by activating select pixels and keeping them ON for the entire length of the bit. Examples of such segmenting, as well as the advantages associated therewith, may be found in U.S. Pat. No. 5,969,710, which is commonly assigned with the present disclosure and incorporated herein by reference in its entirety.

Once the bit sequences have been created, the process moves to block 250. At block 250, a compiler is employed to compile the bit sequences and convert them into PWM signals. As stated above, the intensity to be executed by the pixels corresponds to the length of time the selected pixels are held ON. Thus, since the bits defining the bit-plane are also defining the on-time for the selected pixels, each of those bits (and thus the corresponding on-times of the selected pixels) may be represented by high and low PWM signals. These PWM signals are generated from the bit sequences by the compiler for use as ON/OFF signals to the individual pixels located on the DMD in order to operate the DMD to generate the desired image.

After the necessary PWM signals are generated, the process moves to block 260. At this block, the PWM signals are applied to the DMD for creating the image. Specifically, the PWM signals are loaded into the display memory module 13 and stored until ready for use to operate the DMD. After all the required PWM signals have been loaded and stored, the pixels on the DMD are "reset" in accordance with the stored PWM signals (i.e., pixel operation instructions). A reset command, at block 270, causes the PWM signals to be executed by select pixels, in accordance with the predetermined bit sequences generated above. In one embodiment, a global reset may be done on the DMD, where none of the pixels are activated in accordance with the PWM signals until all of the PWM signals have been loaded. In other embodiments, group resets may be performed across the DMD, where predetermined groups of pixels (typically grouped based on association with generating the same portion of the image) are operated once the PWM signals for those pixels have been loaded. At the same time, however, PWM signals for other pixels may still be in the process of being loaded. In such embodiments, the speed and efficiency of the DMD may be increased by overlapping unrelated loads and resets.

After the selected pixels on the DMD have been operated, the process then moves to an end step 280, where the process may be repeated for the next images to be generated by the pixels.

Looking now at FIG. 4, illustrated is a table that sets forth bit-weights for exemplary bit-planes in a typical 8-bit system. The displayed 8 bits (bits B0-B7) are arranged in a linear, binary order, as is typically found in conventional systems, although due to the illustrated increasing bit weights from left to right, the least significant bit (LSB) is somewhat unconventionally illustrated as the leftmost bit. As mentioned above, the bit-weights in the illustrated bit-planes are converted to PWM signals for use in operating the DMD within an SLM-based visual display system. As illustrated, all of the bit-weights are selected for each bit-plane shown in FIG. 4 (e.g., bit-planes 1-3) using conventional non-neutral density (non-ND) bits. "Non-ND bits" refers to those bits where the intensity of the light projected onto the DMD for executing those bits is not reduced in order to extend the on-time for the selected pixels.

In such approaches, to illustrate a "1" in the first bit-plane using the available 8 bits, B0 (with a bit-weight of $2^0=1$) is turned ON, while the remaining seven bits are turned OFF. Since B0 is the shortest of the 8 bits (for example, 1/256 of a frame-time in 60 Hz embodiments), it is considered the LSB. To illustrate a "2" in the second bit-plane, B1 (with a bit-weight of $2^1=2$) is turned ON while the remaining bits are turned OFF. Then, to illustrate a "3" in the third bit-plane, B0 (with a bit-weight of $2^0=1$) and B2 (with a bit-weight of $2^1=2$) are both turned ON (3=B0+B1), while the remaining bits are turned OFF. Of course, other larger bit-weights than those illustrated in FIG. 3 may also be generated in other bit-planes, depending on the desired application.

Referring now to FIG. 5, illustrated is a table that sets forth bit-weights for exemplary bit-planes in an 8-bit system employing ND bits and an ND spoke light recapture segment, in accordance with the related disclosures cited above. The displayed 8 bits (bits B0-B7) are again arranged in a linear, binary order, but now include decimals (or percentages) of whole bits, in accordance with an ND approach. As such, the bit-weights selected for the non-ND bits are bits B5-B7, while those selected for ND bit-weights are bits B0-B3. Finally, an exemplary ND-spoke segment for ND spoke light recapture is illustrated with an exemplary weighting of 4.

The ND-spoke segment would generally be introduced at the higher intensities through the normal binary progression, e.g., at intensity level 16 or higher on a binary scale from 0-255. It may be desirable, however, to depart from a continually increasing relationship between the bit weightings and the relative position of the bits in order to introduce the ND spoke segment at a still higher intensity level as discussed above. Using the ND spoke segments only at the maximum intensity levels will help ensure that any intensity or colorimetry errors are introduced where they will be less perceptible to the human observer, as mentioned above.

Further, a smoother transition may be provided by multiplexing or intermixing ND bits with non-ND bits while elevating intensity. In a similar way, one or more spoke light bits can be gradually introduced, particularly in systems that encode the intensity with a larger number of bits, such as in 16-bit systems. As with the spoke light bits, transitions between ND and non-ND bits are typically more noticeable at lower intensities. As a result, such multiplexing of bit types may only need to be done at lower intensities, when transitions between the two are more noticeable to viewers of the display system. FIG. 5 accordingly shows an exemplary bit progression in which the least significant two bits (B0 & B1), which are ND bits, are not added in until at the later bit planes, whereas the third and fourth least significant bits (B2 and B3), which are also ND bits, are the initial bit weightings and are introduced first. The use of these bits would be effectively intermingled with those of the ND-spoke bit, B4 (weighted at 4), and the non-ND bits, B5 (a weighted at 8), B6 (16 weighting), and B7 (32 weighting), as the bit-planes sequences progress through the binary progression shown. The least significant two bits (weighted at 0.25 and 0.5) are not introduced in this embodiment of the bit-plane progression until the later bit-planes.

Thus, a multiplexing of ND and non-ND bits is done at the least significant bits, and an example of this multiplexing is discussed with reference to FIG. 5, whereas the non-ND bits can be introduced without intermixing with non-ND bits at the higher intensities, at the same time as the spoke light bits are introduced. Moreover, although FIG. 5 illustrates a non-binarily increasing arrangement of bits, the principles disclosed herein are equally applicable to binary arrangements.

Thus, although there has been disclosed to this point a particular embodiment spoke light recapture in sequential color imaging systems and methods thereof, it is not intended that such specific references be considered as limitations upon the scope of this invention except insofar as set forth in any claims that may issued from this disclosure. For example, rather than devoting a separate bit to the ND-spoke segment, this segment could be designed to always be activated with the most significant bit of the color intensity word. Furthermore, it is to be understood that further modifications to the described embodiments may now suggest themselves to those skilled in the art, and the present disclosure is intended to cover all such modifications as fall within the scope of any claims that may issued from this disclosure. Additionally, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A video display system, comprising:
   a spatial light modulator, such that said spatial light modulator creates images by deflection of selected ones of an array of individual pixels over a period of time, wherein the period is divided into intervals;
   a light source operable to illuminate the spatial light modulator;
   a color wheel interposed between the light source and the spatial light modulator, the color wheel comprising:
      a plurality of color filter segments for transmitting or reflecting respective colors, at least two of which transmit or reflect a same one of a primary color;
      one of the at least two color filter segments being a uniform filter segment and another of the at least two color filter segments comprising two split segments and a neutral density segment located between the split segments and having a transmissivity or reflectivity for the one color that is lower than the corresponding transmissivity or reflectivity for the one color of the split segments; and
      neutral density spokes at respective borders between the neutral density segment and the respective split segments; and
   a processing system operable to modulate the pixels of the spatial light modulator according to bit-planes and bit sequences defined for the bit-planes, the bit-planes including at least one neutral density spoke bit-plane to be applied when the light source is impinging on the neutral density spokes.

2. A video display system according to claim 1, wherein the processing system is operable to cause display of a plurality of image intensity levels and is operable to use the at least one neutral density spoke bit-plane only at higher image intensity levels exceeding a given value in the plurality of image intensity levels.

3. A video display system according to claim 1, wherein the processing system is further operable to define the bit sequences for the bit-planes.

4. A video display system according to claim 1, wherein the processing system is further operable to compile bit sequences from the bit-planes.

5. A video display system according to claim 4, wherein the bit sequences are pulse-width-modulated bit sequences.

6. A video display system according to claim 1, wherein the color wheel further comprises at least one white light segment which transmits or reflects white light, and wherein the processing system is further operable to include non-neutral density spoke light with the white light segment.

7. A video display system according to claim 1, wherein the color wheel is divided into red, green and blue primary color filter segments.

8. A video display system according to claim 7, wherein the one color is green.

9. A video display system according to claim 1, wherein the at least one neutral density spoke bit-plane is a spoke recapture bit-plane and includes a neutral density spoke bit to be employed in defining the spoke recapture bit-plane in a bit sequence.

10. A video display system according to claim 1, wherein the neutral density spoke bit is employed when the intensity defined by the spoke recapture bit-plane is proximate to the maximum intensity produced by the spatial light modulator.

11. A video display system according to claim 10, wherein the neutral density spoke bit is employed at level 16 intensity or higher on a binary scale of 0-255 intensity levels.

12. A method of display an image using a spatial light modulator, such that said spatial light modulator creates images by deflection of selected ones of an array of individual pixels over a period of time, wherein the period is divided into intervals, the method comprising:
   illuminating the spatial light modulator with a light source;
   interposing a color wheel between the light source and the spatial light modulator, the color wheel comprising:
      a plurality of color filter segments for transmitting or reflecting respective colors, at least two of which transmit or reflect a same one of a primary color;
      one of the at least two color filter segments being a uniform filter segment and another of the at least two color filter segments comprising two split segments and a neutral density segment located between the split segments and having a transmissivity or reflectivity for the one color that is lower than the corresponding transmissivity or reflectivity for the one color of the split segments; and
      neutral density spokes at respective borders between the neutral density segment and the respective split segments; and
   modulating the pixels of the spatial light modulator according to bit-planes and bit sequences defined for the bit-planes, the bit-planes including at least one neutral density spoke bit-plane applied when the light source is impinging on the neutral density spokes.

13. A method according to claim 12, wherein the at least one neutral density spoke bit-plane is applied at image intensity levels that exceed a given value in a plurality of image intensity levels.

14. A method according to claim 12, further comprising compiling the bit sequences from the bit-planes.

15. A method according to claim 14, wherein the bit sequences comprise pulse-width-modulated bit sequences.

16. A method according to claim 12, wherein the color wheel further comprises at least one white light segment which transmits or reflects white light, and the method further comprises providing non-neutral density spoke light with the white light segment.

17. A method according to claim 12, wherein the color wheel is divided into red, green and blue primary color filter segments.

18. A method according to claim 12, wherein the least one neutral density spoke bit-plane is a spoke recapture bit-plane having a neutral density spoke bit employed in defining the spoke recapture bit-plane in a bit sequence.

19. A method according to claim 18, wherein the neutral density spoke bit is employed when the intensity defined by the spoke recapture bit-plane is proximate to the maximum intensity produced by the spatial light modulator.

20. A method according to claim 19, wherein the neutral density spoke bit is employed at level 16 intensity or higher on a binary scale of 0-255 intensity levels.

21. A video display system according to claim 1, wherein the at least one neutral density segment consists of a single neutral density segment.

* * * * *